(12) United States Patent
Rottmayer et al.

(10) Patent No.: US 6,404,601 B1
(45) Date of Patent: Jun. 11, 2002

(54) MERGED WRITE HEAD WITH MAGNETICALLY ISOLATED POLETIP

(75) Inventors: Robert E. Rottmayer, Wexford; Jian-Gang Zhu, Pittsburgh, both of PA (US); Kyusik Sin, Palo Alto; Ronald A. Barr, Mountain View, both of CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/490,518

(22) Filed: Jan. 25, 2000

(51) Int. Cl.[7] .............................. G11B 5/31; G11B 5/39; G11B 5/187
(52) U.S. Cl. ...................... 360/317; 360/126; 360/119
(58) Field of Search ................................ 360/125, 126, 360/317, 119

(56) References Cited

U.S. PATENT DOCUMENTS

| | | | |
|---|---|---|---|
| 4,639,808 A | 1/1987 | Thornley | 360/121 |
| 4,639,811 A | 1/1987 | Diepers et al. | 360/125 |
| 5,270,895 A | 12/1993 | Ruigrok et al. | 360/126 |
| 5,285,340 A | 2/1994 | Ju et al. | 360/119 |
| 5,452,163 A | 9/1995 | Coffey et al. | 360/113 |
| 5,452,164 A | 9/1995 | Cole et al. | 360/113 |
| 5,508,867 A | 4/1996 | Cain et al. | 360/113 |
| 5,515,221 A | 5/1996 | Gill et al. | 360/113 |
| 5,606,478 A | * 2/1997 | Chen et al. | 360/126 |
| 5,621,592 A | 4/1997 | Gill et al. | 360/113 |
| 5,661,621 A | 8/1997 | Kobayashi et al. | 360/113 |
| 5,739,991 A | 4/1998 | Matono et al. | 360/113 |
| 5,812,350 A | * 9/1998 | Chen et al. | 360/126 |
| 5,850,325 A | 12/1998 | Miyauchi et al. | 360/113 |
| 5,872,691 A | 2/1999 | Fukuyama et al. | 360/113 |
| 6,151,193 A | * 11/2000 | Terunuma et al. | 360/126 |
| 6,163,442 A | * 12/2000 | Gill et al. | 360/317 |

FOREIGN PATENT DOCUMENTS

WO 90/09658 * 8/1990

* cited by examiner

*Primary Examiner*—William Klimowicz
(74) *Attorney, Agent, or Firm*—Mark Lauer

(57) ABSTRACT

A magnetic head has an exchange isolated poletip located between a shield of an MR sensor and a write pole of an inductive sensor. The poletip is preferably made of high $B_s$ material, allowing the flux that travels through the much larger pole layer to funnel through the poletip without saturation. The poletip is isolated from the shield layer in order to decouple the shield layer from unfavorable domain patterns that may occur in the poletip, which in turn reduces noise in the sensor, while the shield layer serves to complete the inductive circuit. Despite having a poletip isolated by nonmagnetic material, heads built according to this invention have demonstrated high overwrite as well as remarkably low noise.

21 Claims, 3 Drawing Sheets

MERGED WRITE HEAD WITH MAGNETICALLY ISOLATED POLETIP

TECHNICAL FIELD

The present invention relates to electromagnetic transducers such as may be employed in disk or tape storage systems.

BACKGROUND OF THE INVENTION

Electromagnetic transducers such as heads for disk or tape drives commonly include Permalloy (approximately $Ni_{80}Fe_{20}$), which is formed in thin layers to create magnetic features. For example, an inductive head may have conductive coils that induce a magnetic flux in an adjacent Permalloy core, that flux employed to magnetize a portion or bit of an adjacent media. That same inductive head may read signals from the media by bringing the core near the magnetized media portion so that the flux from the media portion induces a flux in the core, the changing flux in the core inducing an electric current in the coils. Alternatively, instead of inductively sensing media fields, magnetoresistive (MR) sensors or merged heads that include MR sensors may have thin layers of materials that are used to read magnetic signals by sensing changes in electrical resistance of the MR sensor that are caused by such signals.

In order to store more information in smaller spaces, transducer elements have decreased in size for many years. One difficulty with this deceased size is that the amount of flux that needs to be transmitted may saturate elements such as magnetic pole layers, which becomes particularly troublesome when ends of the pole layers closest to the media, commonly termed poletips, are saturated. Magnetic saturation in this case limits the amount of flux that is transmitted through the poletips, limiting writing or reading of signals. Moreover, such saturation may blur that writing or reading, as the flux may be evenly dispersed over an entire poletip instead of being focused in a corner that has relatively high flux density. For these reasons the use of high magnetic moment (high $B_s$) materials in magnetic core elements has been known for many years to be desirable. For instance, iron is known to have a higher magnetic moment than nickel, so increasing the proportion of iron compared to nickel generally yields a higher moment alloy. While a number of other high-magnetic moment materials are known in the art, such as Sendust (Fe—Ni—Al) and CoZrTa, the use of predominantly-iron NiFe alloys, such as $Ni_{45}Fe_{55}$, has advantages including similarities to Permalloy that can facilitate forming high moment elements.

As noted in U.S. Pat. No. 5,606,478 to Chen et al., the use of high moment materials has been proposed for layers of magnetic cores located closest to a gap region separating the cores. Also noted by Chen et al. are some of the difficulties presented by these high moment materials, including challenges in forming desired elements and corrosion of the elements once formed. Chen et al. note that magnetostriction is another problem with $Ni_{45}Fe_{55}$, and teach the importance of constructing of heads having Permalloy material layers that counteract the effects of that magnetostriction. This balancing of positive and negative magnetostriction with plural NiFe alloys is also described in U.S. Pat. No. 5,874,010 to Tao et al. Anderson et al., in U.S. Pat. No. 4,589,042, also suggest that magnetostriction may be a problem with $Ni_{45}Fe_{55}$, and teach the use of high moment $Ni_{45}Fe_{55}$ for poletip layers.

Another difficulty encountered with thin film inductive heads involves the shape of the pole layers near the poletips. The pole layers typically curve outward from the poletips in order to circumvent the coil and insulation layers sandwiched between the pole layers. This curvature between layers that are parallel in the vicinity of the recording gap can allow bleeding of the signal across the curving pole layers, diminishing fringing fields from the gap that are used to write on the media. Also problematic can be accurately defining the poletips, which may each be formed as part of a pole layer through a much thicker mask layer. An indefinite poletip width causes the track width of the head to be uncertain. To overcome these problems, U.S. Pat. No. 5,285,340 to Ju et al. and U.S. Pat. No. 5,452,164 to Cole et al. teach forming poletips in separate steps from forming pole layers, and stitching the poletips to the pole layers so that magnetic continuity is established between the intimately connected pole layers and poletips.

The combination of MR sensors with inductive heads introduces additional complications. Although the MR sensor may be unshielded, a pair of magnetically permeable shields usually sandwiches the sensor in order to restrict the magnetic fields reaching the sensor, essentially focusing the sensor. In one type of combined head, sometimes termed a piggyback head, the shields are separated from the inductive transducer by a layer of nonmagnetic material such as alumina ($Al_2O_3$). An integrated head, on the other hand, uses the pole layers of the inductive transducer as shields for the MR sensor, which is formed in the recording gap in order to ensure that the sensor and inductive transducer are aligned with the same recording track of the medium despite any skewing of the head relative to such a track. Perhaps the most common type of head currently employed for hard disk drives is a merged head, in which one pole layer of the inductive transducer forms one shield of the sensor.

U.S. Pat. No. 5,850,325 to Miyauchi et al. teaches reducing the separation between the shield and pole layers of a piggyback head to a layer of nonmagnetic material that is thin enough to allow coupling between the shield and pole layers. With the exception of a recording gap, such an inductive transducer ensures a continuous magnetic circuit through the pole layers, since it is known that any feature that increases the reluctance associated with magnetic portions of the head decreases the efficiency of that head. Further discussion of the requirements and challenges of transducer technology can be found in *Magnetic Recording Technology*, 2nd Edition, C. Denis Mee and Eric D. Daniel, Chapter 6, incorporated herein by reference.

SUMMARY OF THE INVENTION

The present invention provides a magnetic head that overcomes the challenges outlined above to provide superior performance. A magnetically isolated poletip is located between a shield of an MR sensor and a write pole of an inductive sensor. The poletip is preferably made of high $B_s$ material, allowing the flux that travels through the much larger pole layer to funnel through the poletip without saturation. The poletip is isolated from the shield layer in order to decouple the shield layer from Barkhausen noise that may occur in the poletip, which in turn reduces noise in the sensor, while the shield layer serves to complete the inductive circuit. Despite having a poletip surrounded by nonmagnetic material, heads built according to this invention have demonstrated high overwrite as well as remarkably low noise.

DESCRIPTION OF THE PREFERRED EMBODIMENT

Figure 1:
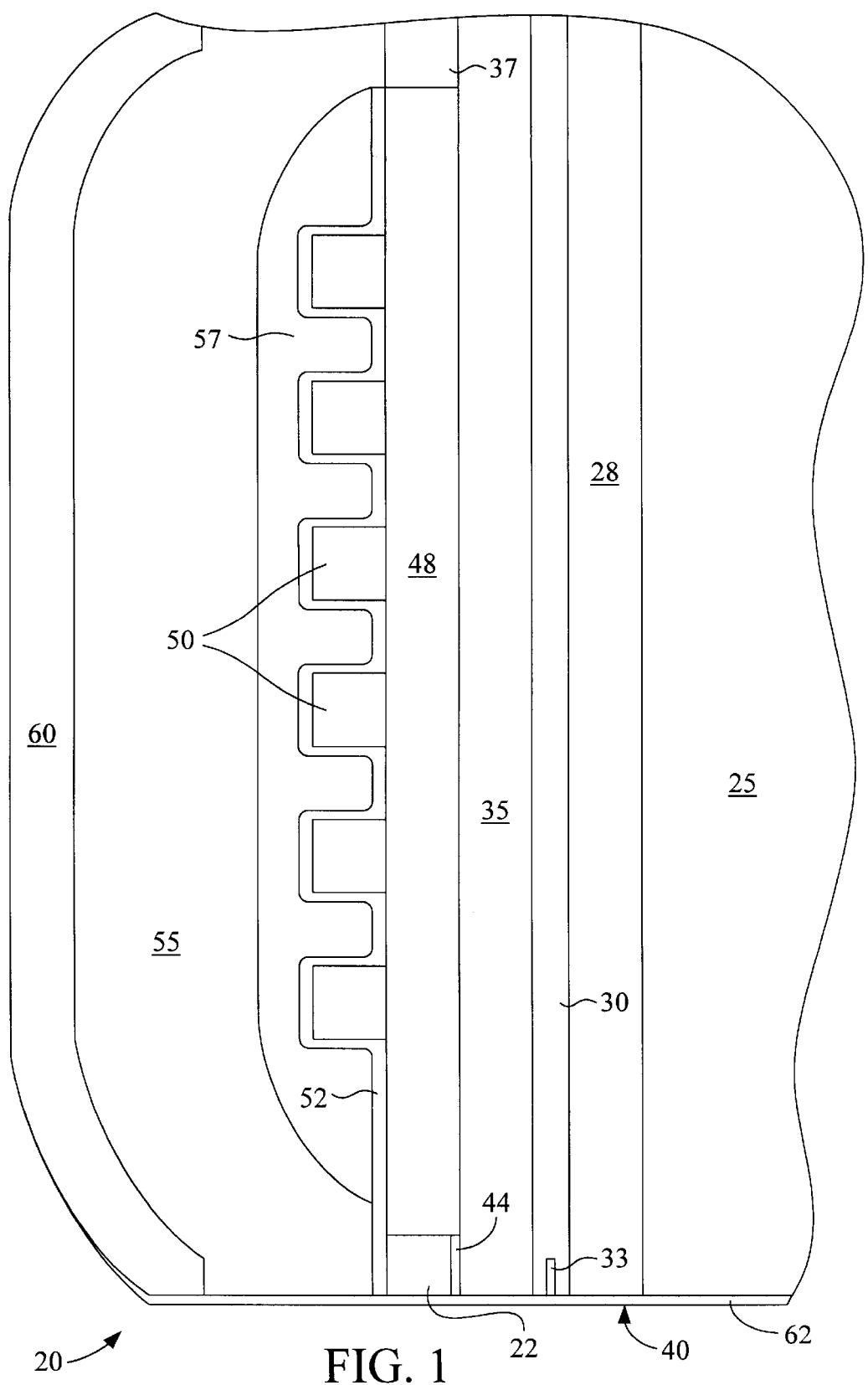
FIG. 1 is a cutaway cross-sectional view of a head including a transducer of the present invention.

Referring now to FIG. 1, a cross-sectional view of a portion of a head 20 of the present invention shows a magnetically isolated poletip 22. A number of such heads are formed in a plurality of thin layers on wafer, which is then diced to form a number of individual heads that may include a portion of the wafer as a substrate 25. The substrate may contain alumina, $Al_2O_3TiC$ or other conventional materials. A first magnetically permeable shield layer 28 is shown disposed atop the substrate 25, although a thin interlayer of alumina or the like may first be formed on the substrate. A read gap 30 composed of electrically insulative, nonmagnetic material such as $Al_2O_3$ surrounds an MR sensor 33. The MR sensor 33 may include a single layer of anisotropic magnetoresistive (AMR) material such as Permalloy, or the sensor may contain plural or multiple layers of sensor materials as is known to form a spin valve (SV) sensor, giant magnetoresistive (GMR) sensor, dual stripe magnetoresistive (DSMR) sensor or other known types of sensing mechanisms.

An electrically insulative, nonmagnetic layers 29 formed of material such as $Al_2O_3$ surround shield layer 28. Although the read gap 30 is shown as a single layer in this figure for conciseness, it may actually be formed of plural layers as is conventional. A second magnetically permeable shield layer 35 is disposed atop the read gap 30, the second shield layer adjoining a magnetically permeable pedestal 37 distal to a media-facing surface 40 of the head 20. Both the second magnetically permeable shield layer 35 and the magnetically permeable pedestal 37 may be formed of Permalloy or similar materials. Another electrically insulative, nonmagnetic layer 31 formed of material such as $Al_2O_3$ surrounds shield layer 35.

The magnetically isolated poletip 22 is separated from the shield layer 35 by a submicron layer of nonmagnetic material 44. The nonmagnetic layer 44 may be formed of various nonmagentic materials such as alumina or various other oxides, tantalum (Ta), titanium (Ti) or other metals, silicon (S), carbon (C) or other elements. The insulative layer 44 should provide exchange decoupling between the poletip and the shield layer 35 and for that reason it is important that the layer does not permit coupling between the layers. On the other hand, the layer 44 should be thin enough to allow magnetic write signals to pass between the shield 35 and the poletip 22. The exchange decoupling layer 44 effectively prevents domains from the poletip to influence the shield, yet allows magnetic write fields to pass through the layer 44, filtering noise from signals. This shielding layer 44 allows the poletip 22 to contain high $B_s$ materials, such as $Ni_{45}Fe_{55}$, FeN, FeRhN, FeTaN or FeAlN, that otherwise may be problematic. The thickness of layer 44 is preferably less than about 100 Å, in order to ensure that poletip 22 is not too isolated from shield 35, and a 50 Å layer of Ta has proven particularly effective in this regard.

Between poletip 22 and pedestal 37 is a nonmagnetic, electrically insulating layer 48 which may be formed of alumina or other known materials. Adjoining insulating layer 48 is a conductive coil layer 50, which may be formed of various highly conductive materials such as gold (Au) or copper (Cu). Although six windings are shown in this figure, more or less windings may be patterned in coil layer 50. A recording gap layer 52 of nonmagnetic, electrically insulating material such as alumina adjoins the coil layer 50 and insulating layer 48, and separates the poletip 22 from a write pole layer 55. Another nonmagnetic, electrically insulating layer 57 formed with a material such as baked photoresist is disposed between the coil windings. A first protective layer 60 may be formed on the pole layer 55 on what will be a trailing end of head 20, and a second protective layer 62 may be formed on the media-facing surface 40 after the wafer has been diced, the layers made of corrosion resistant, nonmagnetic materials. For the situation in which a corrosion resistant protective layer such as layer 62 is not formed, poletip 22 still has a nonmagnetic material such as air or perhaps lubricant adjoining its media-facing surface, so that the poletip is isolated from other magnetic materials.

Figure 2:
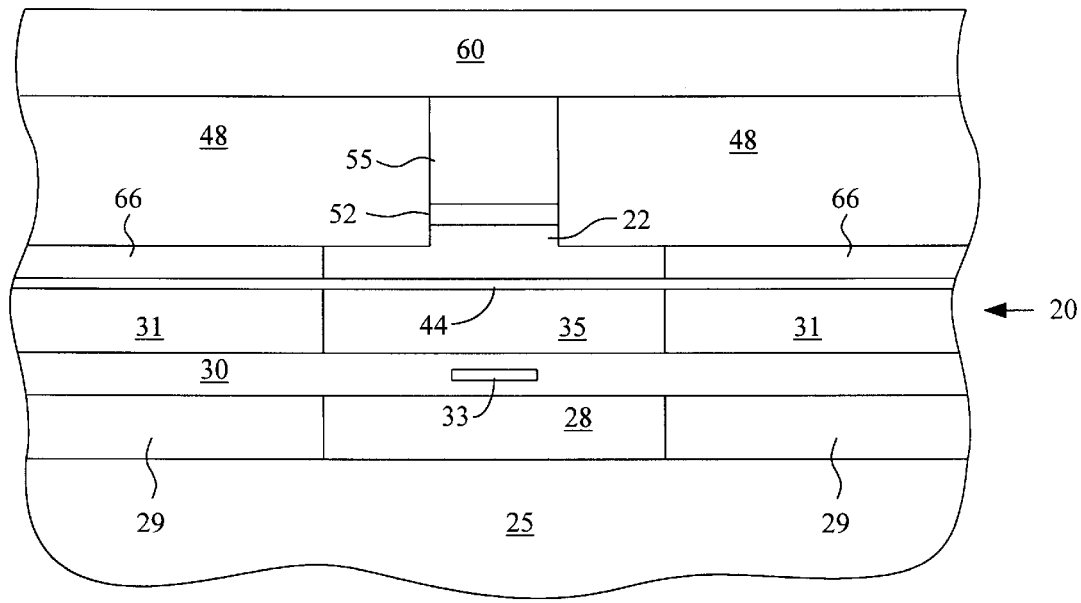
FIG. 2 is a cutaway media-facing view of the head and transducer of FIG. 1.

FIG. 2 shows a view of the head 20 of FIG. 1 as it appears from the perspective of a associated media on which the head reads and writes, looking through any transparent protective layer that may be formed on the media-facing surface of the head. The isolation of poletip 22 from other magnetic elements such as shield layer 35 and write layer 55 is evident in this view of the head as it interacts with a disk or tape. A double recording gap is in effect provided by nonmagnetic layers 44 and 52, however, this does not appear to interfere with writing signals to the media since layer 44 is typically much thinner than layer 52 and produces a much smaller fringing field than that adjacent gap layer 52. Additionally, the desired recording gap layer 52 encounters the media after the isolation layer 44 and thus overwrites any magnetic pattern written on the media by layer 44. Also apparent from this figure is that electrically insulating, nonmagnetic layer 48 surrounds pole layer 55, whereas another electrically insulating, nonmagnetic layer 66 adjoins layers 44 and 48 and isolated pole 22. During trimming of pole 22 it is important to avoid removing isolation layer 44.

Figure 3:
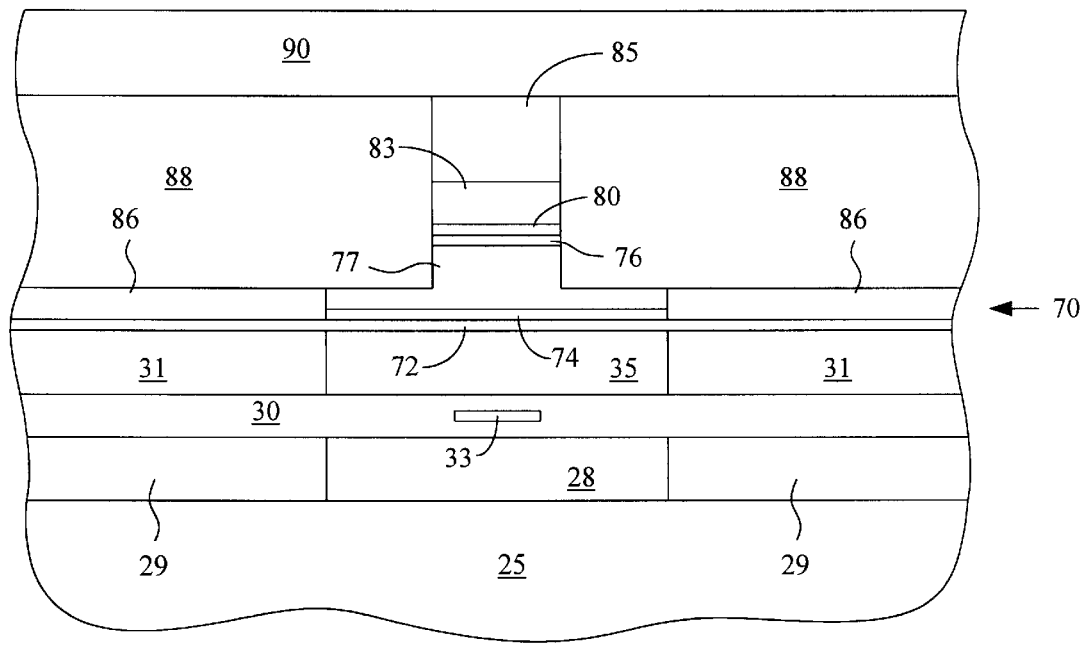
FIG. 3 is a cutaway media-facing view of a second embodiment of a head including a transducer of the present invention.

FIG. 3 shows another embodiment of the present invention including a portion of a head 70 as it appears from an associated media. For conciseness, those features or elements that are effectively the same as shown in FIG. 2 will not be reiterated here. Much as before, a nonconductive or highly resistive, nonmagnetic layer 72 is formed, preferably of Ta having a thickness less than about 100 Å and extending beyond an area adjacent a poletip. A magnetically permeable layer 74 such as Permalloy is then formed on the nonmagnetic layer. Both these layers 72 and 74 may be sputter-deposited, and are followed by a layer of high $B_s$ material, preferably $Ni_{45}Fe_{55}$, which may be electroplated via window frame plating or other known techniques to form isolated poletip 77, creating an island of magnetic material encircled by electrically insulating layers 86 and 88.

A recording gap layer 76 of insulating, nonmagnetic material such as alumina is formed to a thickness that may be less than is conventional, preferably between about 1000 Å–2000 Å, to allow space in the recording gap for a nonmagnetic seed layer 80 such as chromium (Cr). The Cr seed layer 80 provides a favorable crystallographic template for sputtering or other epitaxial deposition of a high $B_s$ and high permeability poletip layer 83 of $Ni_{45}Fe_{55}$. A thicker layer 85 of high $B_s$ and high permeability $Ni_{45}Fe_{55}$ is electroplated via window frame plating or other known techniques atop layer 83 to form the remainder of a trailing write pole, which is surrounded by nonmagnetic, electrically insulating layer 88. A protective coating 90 is formed on the trailing pole layer 85 and insulating material 88 to create a trailing end for the head 70.

Figure 4:
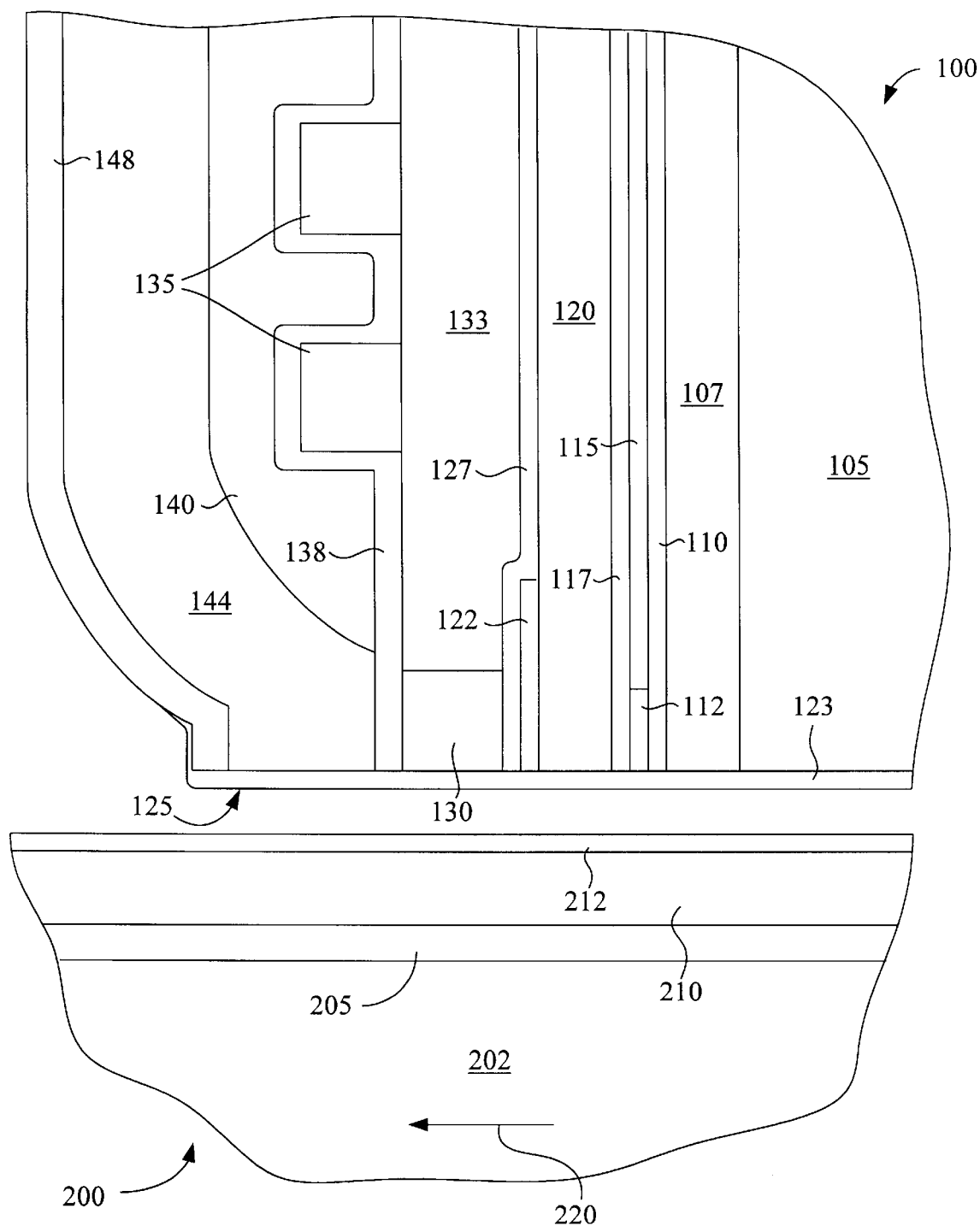
FIG. 4 is a cutaway cross-sectional view of a head including a transducer of the present invention interacting with an associated media.

FIG. 4 shows a head 100 of the present invention interacting with a media such as a rigid disk 200. Much as described above, the head 100 of this embodiment has a substrate 105 and a magnetically permeable first shield 107. A nonmagnetic first read gap layer 110 adjoins the shield 107 and an MR sensor 112, the sensor preferably incorporating plural layers forming one of a variety of known sensing mechanisms. A nonmagnetic back gap layer 115 and a second read gap layer 117 surround the sensor 112 in this cross-sectional view. A second magnetically permeable shield layer 120 adjoins the second read gap layer, and a nonmagnetic, electrically insulating or highly resistive isolation layer 122 is disposed on the second shield adjacent a protective coating 123 that forms a media-facing surface 125 of the head 100. The isolation layer 122 is preferably formed to a thickness of less than 100 Å, and extends from the media-facing surface 125 much further than the sensor 112. A seed layer 127 of Permalloy or other magnetically permeable materials is formed on the isolation layer 122 adjacent the media-facing surface 125 and on the second shield layer 120 distal to the media-facing surface, the seed layer preferably formed by sputtering to a thickness in a range between about 500 Å and 1000 Å.

A magnetic poletip 130 is then formed, preferably of high $B_s$ material such as $Ni_{45}Fe_{55}$, atop a portion of the seed layer closest to the media-facing surface. The poletip 130 may extend significantly less than the isolation layer from the media-facing surface. Although not shown in this cross-sectional drawing, the isolation layer also extends much further than the poletip 130 in a direction into and out of the plane of the drawing, the isolation layer preferably extending about as far as the seed layer 127 while the poletip extends only as far as a recording track width. A nonmagnetic, electrically insulating spacer layer 133 adjoins the poletip 130 distal to the media-facing surface 125, and a conductive coil layer 135 and recording gap layer 138 are formed on the planar interface presented by the poletip and spacer. Another nonmagnetic, electrically insulating spacer layer 140 encircles the conductive coil layer 135 windings, and a write pole layer 144, preferably formed of a magnetically permeable, high $B_s$ material such as $Ni_{45}Fe_{55}$, is disposed on the recording gap layer 138 and spacer layer 140. The coil layer 135 is disposed significantly further from the media-facing surface 125 than the termination of both poletip 130 and isolation layer 122, affording a reduced apex angle to the write pole layer 144.

The disk 200 includes a wafer substrate 202 that may be made of glass, SiC, aluminum, or any of a number of other materials known to be used for this purpose. The substrate may or may not be roughened or patterned, as is known in the art, and is covered with an underlayer 205 that may provide adhesion and a desired structure for a media layer 210 formed on the underlayer. The media layer 210 may be a conventional cobalt (Co) based alloy, which may include elements such as chromium (Cr), platinum (Pt) and tantalum (Ta), for instance. Although a single media layer 210 is shown for conciseness, layer 210 may actually represent several layers as is known, and may be designed for longitudinal or perpendicular data storage. The underlayer 205 may include Cr, nickel aluminum (NiAl), magnesium oxide (MgO) or other materials known in the art, and may be formed of more than one layer. Atop the media layer 210 a thin overcoat 212 is formed of a dense, hard material such as diamond-like carbon (DLC), tetrahedral amorphous carbon (ta-C), silicon carbide (SiC) or other materials. The disk 200 is spinning relative to the head 100 as shown by arrow 220, at operating speeds that may range from 1000 RPM to over 10,000 RPM. Although the head is shown spaced from the disk in this figure, it is known that the head may alternatively contact the disk.

Although we have focused on teaching the preferred embodiment, other embodiments and modifications of this invention will be apparent to persons of ordinary skill in the art in view of these teachings. Therefore, this invention is to be limited only by the following claims, which include all such embodiments and modifications when viewed in conjunction with the above specification and accompanying drawings.

What is claimed is:

1. A head for information storage and retrieval, the head comprising:

an inductive transducer including a conductive coil, a magnetically soft pole layer and a magnetically soft poletip, with said poletip separated from said pole layer by a submicron, nonmagnetic layer, a magnetoresistive sensor separated from said conductive coil by a magnetically soft shield layer, a second submicron, nonmagnetic layer separating said poletip from said shield layer, and a submicron, magnetically soft layer seed layer adjoining said poletip and said second submicron, nonmagnetic layer.

2. The head of claim 1 wherein said seed layer adjoins said shield layer.

3. The head of claim 1 wherein said second submicron, nonmagnetic layer contains tantalum.

4. The head of claim 1 wherein said second submicron, nonmagnetic layer has a thickness less than about 100 Å.

5. The head of claim 1 wherein said head has a media-facing surface and said second submicron, nonmagnetic layer extends beyond said poletip in a direction along said media-facing surface.

6. The head of claim 1 wherein said head has a media-facing surface and said second submicron, nonmagnetic layer extends beyond said poletip in a direction away from said media-facing surface.

7. The head of claim 1 wherein said poletip contains a high magnetic moment material.

8. The head of claim 1 wherein said pole layer contains a high magnetic moment material.

9. A head for information storage and retrieval, the head comprising:

a solid body including an inductive transducer, a magnetoresistive sensor, and a surface adapted for facing a storage medium, said transducer including a conductive coil having a plurality of windings, a magnetically soft pole layer and a magnetically soft poletip, with said pole layer extending in a direction away from said surface past said windings, said poletip extending in said direction less than a distance between said surface and said coil, and said sensor being separated from said conductive coil by a magnetically soft shield layer, wherein said poletip is separated from said pole layer by a first submicron, nonmagnetic layer and is separated from said shield layer by a second submicron, nonmagnetic layer, with a submicron magnetically soft seed layer adjoining said poletip and separated from said shield layer by said second submicron, nonmagnetic layer.

10. The head of claim 9 wherein said poletip is surrounded by nonmagnetic material.

11. The head of claim 9 wherein said second submicron, nonmagnetic layer contains tantalum.

12. The head of claim 9 wherein said second submicron, nonmagnetic layer has a thickness less than about 100 Å.

13. The head of claim 9 wherein said second submicron, nonmagnetic layer extends in a direction along said media-facing surface further than said poletip.

14. The head of claim 9 wherein said poletip contains a high magnetic moment material.

15. The head of claim 9 wherein said seed layer adjoins said shield layer.

16. The head of claim 9 wherein said seed layer has a thickness less than 1000 Å.

17. A head for information storage and retrieval, the head comprising:

a magnetoresistive sensor separated from a first magnetically soft layer by a first nonmagnetic layer, a magnetically soft poletip separated from said first magnetically soft layer by a second nonmagnetic layer, a submicron, magnetically soft seed layer adjoining said poletip and said second nonmagnetic layer, a second magnetically soft layer separated from said poletip by a third nonmagnetic layer, and a coil disposed closer to at least one of said magnetically soft layers than to said poletip.

18. The head of claim 17 wherein said poletip is surrounded by nonmagnetic material.

19. The head of claim 17 wherein said second nonmagnetic layer contains tantalum.

20. The head of claim 17 wherein said second nonmagnetic layer has a thickness less than about 100 Å.

21. The head of claim 17 wherein said poletip contains a high magnetic moment material.

\* \* \* \* \*